United States Patent
Schultz et al.

(10) Patent No.: US 7,598,216 B2
(45) Date of Patent: Oct. 6, 2009

(54) THREE-PHASE LIQUID POLISHING AND CLEANING COMPOSITION

(75) Inventors: Michael A. Schultz, Homer Glen, IL (US); Michael A. Deddo, Oak Brook Terrace, IL (US); Frederic W. Joseph, II, Orland Park, IL (US)

(73) Assignee: Turtle Wax, Inc., Willowbrook, IL (US)

( * ) Notice: Subject to any disclaimer, the term of this patent is extended or adjusted under 35 U.S.C. 154(b) by 114 days.

(21) Appl. No.: 11/646,162

(22) Filed: Dec. 27, 2006

(65) Prior Publication Data

US 2008/0161220 A1  Jul. 3, 2008

(51) Int. Cl.
*C11D 1/00* (2006.01)
*C11D 3/14* (2006.01)
*C11D 3/18* (2006.01)

(52) U.S. Cl. ............ 510/417; 510/189; 510/199; 510/201; 510/203; 510/254; 510/268; 510/466; 510/507; 510/508; 510/511

(58) Field of Classification Search ........... 510/189, 510/199, 201, 203, 254, 268, 417, 466, 507, 510/508, 511
See application file for complete search history.

(56) References Cited

U.S. PATENT DOCUMENTS

| | | | | | |
|---|---|---|---|---|---|
| 5,387,637 | A | * | 2/1995 | Sullivan | 524/493 |
| 6,551,974 | B1 | * | 4/2003 | Conrad et al. | 510/241 |
| 7,374,592 | B2 | * | 5/2008 | Hasinovic et al. | 51/304 |

* cited by examiner

Primary Examiner—Brian P Mruk
(74) Attorney, Agent, or Firm—Olson & Cepuritis, Ltd.

(57) ABSTRACT

A three-phase liquid polishing and cleaning composition of the invention is suitable for polishing and cleaning a painted exterior surface, and includes an organic phase, an aqueous phase, and a particulate phase. The organic phase comprises a petroleum-based liquid and the aqueous phase comprises water. The particulate phase comprises at least one particulate polishing grade abrasive having a mean particle size of not more than about 2.5 microns, which is selected from the group consisting of an abrasive that is harder than the painted surface to be polished and cleaned, and an abrasive that is softer than the painted surface to be polished and cleaned. The composition comprises at least one surfactant (e.g., an anionic surfactant, an emulsifying agent, and a foaming agent) to emulsify the organic and aqueous phases upon mixing (e.g., shaking) the composition, and to suspend the particulate phase in the emulsified organic and aqueous phases.

31 Claims, 1 Drawing Sheet

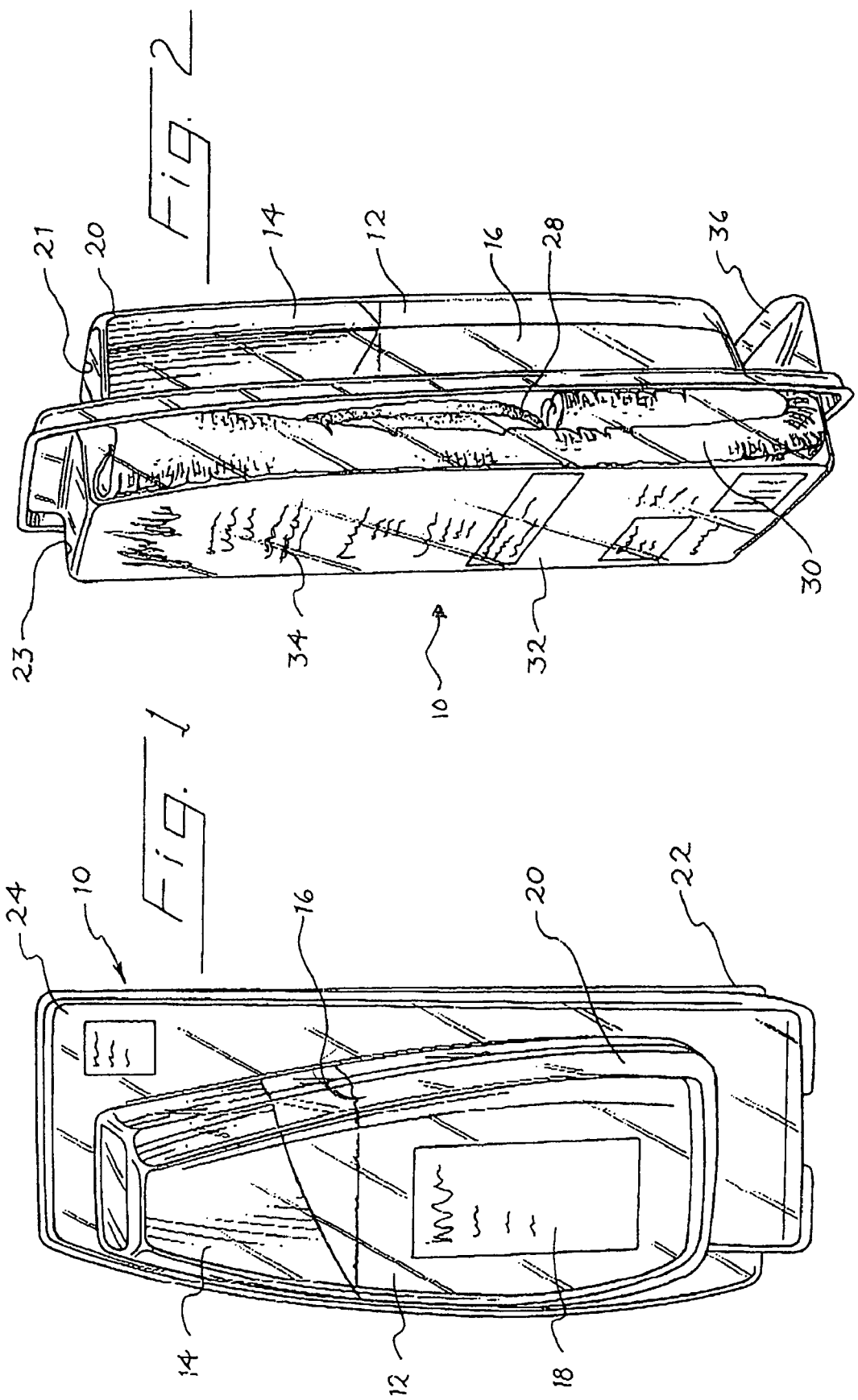

THREE-PHASE LIQUID POLISHING AND CLEANING COMPOSITION

FIELD OF THE INVENTION

This invention relates to a composition suitable for polishing and cleaning a painted exterior surface, e.g., of a car, boat, motorcycle, bicycle, and the like. More particularly, this invention relates to a three-phase liquid polishing and cleaning composition, and to a polishing kit including the composition.

BACKGROUND OF THE INVENTION

Currently, removal of various soils (e.g., dirt, dust, tar, and insect residues) and surface scratches from painted surfaces, such as automotive exterior surfaces, typically requires sequential application of several cleaning and polishing products. For example, liquid detergent products are commonly used to wash the exterior surface of vehicles such as automobiles. Frequently, such exterior surfaces include stains from road tar or insect residue, which may not be adequately removed by common detergent products. Specialized "bug and tar" removing compositions are sold to remove such stains. The tar and bug removal products are typically used before washing the surface of the automobile, since residues from the removal product must be washed off after use. In addition, solid clay-based abrasive products, commonly referred to as "clay bars" have been used to remove surface contaminants from painted surfaces, such as automotive exterior surfaces. After the surface has been rubbed with the clay bar and a lubricant, the surface must then be washed or polished to remove the clay residue. Additionally, scratch and swirl removing compositions are needed to remove paint finish abrasions in order to restore paint finish clarity, especially on scratch sensitive paint finishes or weathered surfaces prior to application of car wax or polish. Thus, cleaning a painted surface and removing surface scratches from the surface often involves multiple products and steps.

Because of the many types of cleaning and polishing products that typically must be used to clean a soiled automotive surface, there is an ongoing need for a convenient unitary product, which can clean a painted surface that includes dirt and dust, as well as tar and/or insect residue, and which also can ameliorate surface scratches. The compositions of the present invention fulfill this need.

SUMMARY OF THE INVENTION

A three-phase liquid polishing and cleaning composition of the invention is suitable for polishing and cleaning a painted exterior surface, such as the surface of a car, boat, motorcycle, bicycle, and the like. The composition includes three phases, i.e., an organic phase, an aqueous phase, and a particulate phase. The organic phase comprises at least one petroleum-based liquid (e.g., a hydrocarbon fluid). Preferably, the petroleum-based liquid comprises at least about 10 percent by weight of a low vapor pressure (LVP) hydrocarbon fluid (i.e., having a vapor pressure of not more than about 0.1 mmHg at 68° F. (about 20° C.), and the aqueous phase mainly comprises water. Preferably, the amount of LVP hydrocarbon is in the range of about 5 percent to about 25 percent by weight.

The particulate phase comprises a polishing grade abrasive having a mean particle size of not more than about 2.5 microns, preferably having a particle size distribution in which not more than about 1 percent of the particles have a size greater than about 45 microns, or having a maximum mesh size of about 40 mesh, U.S. Sieve Series. The relative amount of the abrasives of a particular size can be adjusted from about 1.2 microns to about 45 microns, mean particle size, depending on the duty (light-to-heavy) of abrasiveness desired.

The polishing grade abrasive is selected from the group consisting of an abrasive that is harder than the painted surface to be polished and cleaned, an abrasive that is softer than or as hard as the painted surface to be polished and cleaned, and a combination thereof.

The composition comprises at least one surfactant to emulsify the organic and aqueous phases upon mixing (e.g., shaking) and to suspend the particulate phase in the emulsified organic and aqueous phases. Preferably, the surfactant comprises a combination of an anionic surfactant (e.g., a linear $C_8$-$C_{20}$ alkyl sulfate), an amphoteric surfactant (e.g., a $C_8$-$C_{20}$ alkyl betaine), and a nonionic surfactant (e.g., a $C_8$-$C_{20}$ alkyl amine oxide, a polyalkylene glycol, a polyalkylene glycol ether, or a combination thereof). It is to be understood that the surfactant(s) can be partitioned between two of the three phases or between all of the phases. For example, a portion of the surfactant may be adsorbed onto the surface of the abrasive particles, while another portion of the surfactant may be present in the aqueous phase, the organic phase, or both.

In preferred embodiments, the particulate phase comprises a particulate alumina abrasive (e.g., polishing grade, calcined aluminum oxide), an aluminum silicate abrasive (e.g., polishing grade, calcined Kaolin clay), or a combination thereof. Alumina is a relatively hard abrasive, which is harder than painted finishes typically used on vehicles such as cars, motorcycles, boats, and the like. Aluminum silicate abrasives (e.g., Kaolin clays) are softer than or about as hard as painted finishes typically used on vehicles such as cars, motorcycles, boats, and the like. Preferably, the particulate phase comprises a combination of hard and soft abrasives (e.g., a combination of alumina and aluminum silicate).

While not wishing to be bound by theory, it is believed that an abrasive that is harder than the painted surface can remove or ameliorate surface scratches and swirl marks from the surface when rubbed on the surface in a suitable liquid carrier, while an abrasive that is softer than or as hard as the painted surface can remove tar and other debris (e.g., insect residue) from the surface, without directly affecting the surface finish. The emulsified organic and aqueous phases act as the carrier for the abrasives. In addition, the organic and aqueous phases, combined with the surfactant, provide a cleaning action, and help to keep the abrasive suspended in the composition. Thus, the three-phase compositions of the invention can remove surface scratches and stains (e.g., insect residue and tar), as well as wash the painted surface in one convenient application.

Upon standing undisturbed for prolonged periods of time (e.g., greater than about an hour), the compositions of the invention separate into three distinct phases. The organic phase predominately comprises a hydrocarbon fluid or a hydrocarbon and water emulsion containing a portion of the surfactant. The aqueous phase has a specific gravity greater than the organic phase and comprises mainly water, but can include some small amounts of hydrocarbon solvent dispersed therein as an emulsion, as well as a portion of the surfactant and other water-soluble or water-dispersible ingredients present in the composition. Each of the organic and aqueous phases also can include a portion of the particulate abrasive (e.g., the finest particles in the abrasive may stay suspended even upon standing). The particulate phase has a specific gravity greater than that of the aqueous phase, and mainly comprises the particulate abrasive, as well as portions of the surfactant and water adsorbed onto the particles of the abrasive.

In preferred embodiments, the organic phase comprises about 15 to about 50 percent by weight of the total composition, the aqueous phase comprises about 25 to about 60 percent by weight of the total composition, the particulate phase comprises about 1 to about 25 percent by weight of the total composition, and the surfactant comprises about 10 to about 25 percent by weight of the total composition on an "as is" basis or about 3 to about 10 percent by weight on an actives basis.

In use, the three-phase composition is shaken to emulsify the organic and aqueous phases and to suspend the particulate abrasive in the emulsion. The resulting slurry of abrasive-in-emulsion is then applied to an absorbent applicator and vigorously rubbed onto a premoistened painted surface (e.g., a wet automotive exterior surface). The rubbing action removes surface scratches and swirls, as well as debris, such as insect residue and tar, from the surface. The surface is then rinsed with water to remove any remaining composition and residues, leaving the surface clean and ready for waxing, for example.

Another aspect of the present invention is a polishing kit comprising a three-phase liquid polishing and cleaning composition of the invention in a sealed container, packaged together with an absorbent applicator and instructional indicia describing the composition and how to polish and clean a painted surface with the composition.

BRIEF DESCRIPTION OF THE DRAWINGS

In the drawings,

FIG. 1 is a front perspective view of an automotive polishing kit of the invention.

FIG. 2 is perspective view of the polishing kit shown in FIG. 1, showing the rear and one side of the kit.

DETAILED DESCRIPTION OF PREFERRED EMBODIMENTS

As used herein all weight percent values are given on a total composition weight basis unless otherwise indicated.

The organic phase of the present compositions comprises a petroleum-based liquid. Preferably, the petroleum-based liquid includes a hydrocarbon fluid (e.g., mineral spirits, petroleum distillates, mixtures thereof, and the like). In preferred embodiments the petroleum-based liquid comprises at least about 10 percent by weight of a relatively low vapor pressure liquid hydrocarbon, e.g., a vapor pressure of not more than about 0.1 mmHg at 68° F. (about 20° C.). In some preferred embodiments, the petroleum-based liquid comprises about 40 percent by weight of low vapor pressure liquid hydrocarbon and about 60 percent by weight of light mineral spirits having a vapor pressure of about 3 mmHg at about 20° C. Preferably, the petroleum-based liquid has a volatile organic compound (VOC) content of not more than about 17% percent. Optionally, the organic phase can comprise an oil and water emulsion including a petroleum-based liquid, water, and an emulsifying surfactant. The petroleum-based liquid aids in removing tars, grease and other hydrophobic organic residues from the surface being cleaned.

Abrasives useful in the three-phase compositions of the invention include abrasives that are harder than the painted surface to be polished and cleaned (hard abrasives), abrasives that are softer than or as hard as the painted surface to be polished and cleaned (soft abrasives), and a combination thereof. The abrasives preferably are present in the composition in an amount in the range of about 1 to about 25 percent by weight. The preferred abrasives are polishing grade abrasives that have a mean particle size of not more than about 2.5 microns, which allows the abrasives to remove surface scratches and swirl marks, as well as sticky debris from the painted surface, without harming or further scratching the surface.

Preferred hard abrasives are alumina abrasives such as calcined (or fused) alumina. A low soda calcined alumina having a sodium oxide content of not more than about 0.1 percent by weight is preferred. Suitable polishing grade alumina abrasives are commercially available from a number of sources. A preferred alumina is a calcined P10 grade alumina.

Preferred soft abrasives are aluminum silicate abrasives such as Kaolin clays. A calcined (or fused) Kaolin clay is preferred. Suitable polishing grade Kaolin clay abrasives are commercially available from a number of sources.

When a combination of hard and soft abrasive is utilized, it is preferred that the weight ratio of hard-to-soft abrasive is in the range of about 1:1 to about 1:15. A particularly preferred hard-to-soft abrasive weight ratio is about 1:9.

Surfactants suitable for emulsifying petroleum-based liquids and water are well known in the art, and include nonionic surfactants, anionic surfactants, cationic surfactants, and amphoteric surfactants, as well as mixtures of the various types of surfactants.

Preferably, the three-phase compositions of the present invention contains about 5 to about 15 percent by weight of an anionic surfactant, more preferably about 8 to about 12 weight percent.

The three-phase compositions of the present invention also preferably include about 2 to about 10 percent by weight of a nonionic surfactant, more preferably about 4 to about 8 percent by weight.

In some preferred embodiments, the three-phase compositions of the invention include about 1 to about 5 percent by weight of an amphoteric surfactant, more preferably about 1 to about 3 percent by weight.

The compositions preferably include about 10 to about 25 percent by weight of surfactant (on an "as is" basis, or about 3 to about 10 percent on an actives basis), preferably a combination an anionic surfactant (e.g., sodium lauryl sulfate), an amphoteric surfactant (e.g., cocamidopropyl betaine) and a nonionic amine oxide surfactant ( e.g., a $C_8$-$C_{20}$ alkylamine oxide such as $C_{12}$-$C_{16}$ alkyl(dimethyl)amine oxide, a polyalkylene glycol, a polyalkylene glycol ether, or a combination of two or more of the foregoing), preferably in a weight ratio about 55:37:8 anionic-to-amphoteric-to-nonionic amine oxide. The three-phase compositions of the invention preferably include about 8 to about 12 percent by weight of an anionic surfactant, about 4 to about 8 percent by weight of a one or more nonionic surfactant, and about 1 to about 3 of an amphoteric surfactant.

Anionic, nonionic and amphoteric surfactants and emulsifiers useful in the three-phase compositions of the present invention include surfactants and emulsifiers such as described in the review on surfactants by Cahn and Lynn, "Surfactants and Detersive Systems" *Kirk-Othmer Encyclopedia of Chemical Technology*, 3rd Edition, Volume 22, John Wiley & Sons, New York, pp. 332-432 (1983), the relevant disclosures of which are incorporated herein by reference. An extensive listing of anionic, cationic, nonionic and amphoteric surfactants, and commercial sources thereof, can be found in *McCutcheon's, Volume 1: Emulsifiers & Detergents, North American Edition*, McCutcheon's Division, The Manufacturing Confectioner Publishing Co., Rock Glen, N.J. (2001), the relevant disclosures of which are incorporated herein by reference.

Typical alkylcarboxylates (soaps) include sodium, potassium or ammonium salts of $C_9$-$C_{21}$ fatty or rosin acids such as lauric acid, palmitic acid, stearic acid, coconut fatty acids, hydrogenated coconut fatty acids, oleic acid, and the like.

Typical polyalkoxycarboxylates include alkoxylated alcohols which have been end-capped with chloroacetate or acrylic acid. Polyalkoxycarboxylates are produced by reaction of ethylene oxide, propylene oxide, or mixtures thereof, with an alcohol, to produce an alkoxylated alcohol having about 2 to about 50 moles of oxyalkylene groups per mole of alcohol, followed by reaction of the free hydroxyl end group of the alkoxylate with chloroacetate or acrylate.

Typical N-acylsarcosinates are amidocarboxylates produced by the reaction of a fatty acid or rosin acid chloride with sodium sarcosinate. Commercial examples include sodium N-cocoylsarcosinate, sodium N-laurylsarcosinate, sodium N-oleoylsarcosinate and the like.

Typical commercial linear alkylbenzenesulfonates (LAS) include alkali metal or ammonium salts of alkylbenzenesulfonic acids, wherein the alkyl substituent is a linear $C_7$-$C_{19}$ alkyl group such as sodium dodecylbenzene sulfonate (SDS).

Typical alpha-olefin sulfonates (AOS) are the products of sulfonation of alpha-olefins with sulfur trioxide and air, followed by neutralization of the intermediate sultones. Typical commercial examples include sulfonated $C_{10}$-$C_{14}$ alpha-olefin, generally neutralized with an alkali metal hydroxide, an alkaline earth hydroxide, or an ammonium hydroxide.

Typical dialkylsulfosuccinates are alkali metal or ammonium salts of $C_5$-$C_{18}$ diesters of sulfosuccinic acid, such as sodium diamylsulfosuccinate, sodium dioctylsulfosuccinate, sodium di-(2-ethylhexyl)sulfosuccinate and the like.

Typical commercial alcohol sulfates include alkali metal, alkaline earth metal or ammonium salts of sulfate esters of $C_8$-$C_{20}$ alcohols such as sodium laurylsulfate, sodium 2-ethylhexylsulfate, lauryl triethanolammonium sulfate, sodium octylsulfate and the like.

Typical ethoxylated alcohol sulfates are alkali metal or ammonium salts of sulfate esters of $C_8$-$C_{20}$ alcohols ethoxylated with about 10 to about 40 weight percent of ethylene oxide, based on the weight of alcohol.

Nonlimiting examples of nonionic surfactants useful in the three-phase compositions of the present invention include an alcohol alkoxylate, a polyol ester of a fatty acid, a polyoxyethylene ester of a fatty acid, a fatty acid amide, a polyoxyethylene fatty acid amide, a polyalkylene glycol homopolymer or block copolymer, a polyalkylene glycol ester (e.g., a methyl, ethyl, propyl, or butyl ester), an ethoxylated alkyl mercaptan, an ethoxylated anhydrosorbitol ester, and an alkyl polyglycoside. Also suitable are amine oxides prepared by hydrogen peroxide oxidation of tertiary aliphatic amines such as cetyldimethylamine oxide, stearyldimethylamine oxide, tallow-bis-(2-hydroxyethyl)amine oxide, stearyl-bis-(2-hydroxyethyl)amine oxide, and the like. Combinations of two or more of the aforementioned nonionic surfactants are also useful in the compositions of the present invention.

Typical alcohol alkoxylates include ethoxylated $C_6$-$C_{18}$ linear and branched alcohols, ethoxylated with about 2 to about 80 moles of ethylene oxide, such as ethoxylated lauryl alcohol, ethoxylated stearyl alcohol, and ethoxylated mixtures of $C_6$-$C_{18}$ alcohols, and alkoxylated natural alcohols such as ethoxylated-propoxylated pine oil, ethoxylated soya sterol, and the like.

Typical polyol esters of fatty acids include saturated fatty acid monoglycerides, such as glycerol monolaurate, glycerol monococo ester, glycerol monotallow ester, glycerol monostearate, and the like; saturated fatty acid diglycerides, such as glycerol distearate, glycerol dilaurate and the like; unsaturated fatty acid monoglycerides, such as glycerol monooleate, glycerol monoricinoleate, and the like; unsaturated fatty acid diglycerides, such as glycerol dioleate, glycerol dilinoleate, and the like; glycol esters of fatty acids, such as propylene glycol monostearate, ethylene glycol monostearate, ethylene glycol monolaurate, diethylene glycol monooleate, diethylene glycol monostearate, and the like; and anhydrosorbitol fatty acid esters, such as mono, di and tri esters of 1,4-sorbitan with fatty acids such as stearic acid, palmitic acid and oleic acid.

Typical polyoxyethylene esters of fatty acids are polyethylene glycol mono- and di-esters of fatty acids comprising a polyethylene glycol portion having from about 5 to about 30 ethyleneoxy units, esterified at one or both ends with fatty acids such as stearic acid, lauric acid, oleic acid, and mixed fatty acids derived from natural oils such as coconut oil, castor oil, tall oil, and the like.

Typical fatty acid amides include diethanolamine fatty acid condensates such as coco diethanolamide, lauric diethanolamide, tall oil diethanolamide, and the like, and monoalkanolamine fatty acid condensates such as coco monoethanolamide, lauric monoethanolamide, stearic monoisopropanolamide, oleic monopropanolamide, and the like.

Typical polyoxyethylene fatty acid amides are ethoxylated mono and dialkanolamides having from about 2 to about 50 ethylene oxide groups, including ethoxylated lauric monoisopropanolamide, ethoxylated stearic diethanolamide, ethoxylated myristic monoethanolamide, ethoxylated oleic diethanolamide, and the like.

Typical polyalkylene glycols include homopolymers or block copolymers of ethylene oxide and/or propylene oxide initiated by ethylene glycol, propylene glycol, trimethylol propane, and the like, and have either linear or branched structures, depending on whether the initiator has two or three hydroxyl groups, respectively. Polyalkylene glycol ethers have similar structures, but are capped by an alkyl group (e.g., a $C_1$-$C_4$ alkyl) at one or both ends. Such ethers are typically formed by initiating polymerization of ethylene oxide and/or propylene oxide with an alcohol, such as methanol, ethanol, propanol, or butanol.

Typical ethoxylated alkyl mercaptans, include linear or branched alkyl mercapatans such as dodecylmercaptan, ethoxylated with 2 to 10 moles of ethylene oxide per mole of mercaptan.

Typical ethoxylated anhydrosorbitol esters are mono, di and tri esters of 1,4-sorbitan with fatty acids such as stearic acid, palmitic acid and oleic acid that have been ethoxylated with about 4 to about 20 moles of ethylene oxide per mole of anhydrosorbitol ester.

Typical alkyl polyglycosides are glycosides (acetals) of $C_6$-$C_{20}$ alcohols with a monosaccharide such as glucose, fructose, lactose, mannose, xylose and the like or a polysaccharide or oligosaccharide such as isomaltose, maltose, cellobiose, mellobiose, maltotriose and the like.

Nonlimiting examples of preferred anionic surfactants for use in the three-phase compositions of the invention include linear $C_8$-$C_{20}$ alkyl sulfates, such as sodium lauryl sulfate. Nonlimiting examples of preferred nonionic surfactants useful in the three-phase compositions of the present invention include $C_8$-$C_{20}$ alkyl amine oxides, such as N,N-dimethyl-1-dodecylamine-N-oxide, N,N-dimethyl-1-tetradecylamine-N-oxide, N,N-dimethyl-1-hexadecylamine-N-oxide, and combinations thereof, and polyalkylene glycols, as well as a combination of an alkyl amine oxide and a polyalkylene glycol. Nonlimiting examples of preferred amphoteric surfactants suitable for use in the three-phase compositions of the invention include $C_8$-$C_{20}$ alkyl betaines such as cocamidopropyl betaine, lauramidopropyl betaine, and the like.

Optionally, the compositions of the present invention can include additional additives such as a preservative, an emulsion stabilizing agent, a fragrance, a colorant (e.g., a dye or pigment), a cationic surfactant, a dispersant, a pH adjusting agent, a buffer, and the like.

Preferably the three-phase compositions of the invention, when emulsified, have a basic pH of up to about 11, preferably in the range of about 8 to about 10, more preferably about 8.5 to about 9.2. The pH of the emulsified composition can be adjusted by the addition of an acid or base to achieve the desired pH.

The three-phase compositions of the invention can include an emulsion stabilizing agent, such as a salt-based emulsion stablizer. Nonlimiting examples of preferred emulsion stabilizers include potassium chloride, magnesium chloride, and sodium chloride. Preferably, the emulsion stabilizer is present in the composition in an amount of about of up to about 4 percent by weight, more preferably in the range of about 0.25 to about 4 percent by weight, most preferably about 0.5 to about 1 percent by weight.

In preferred embodiments, the composition also includes a preservative, e.g., in an amount in the range of about 0.05 to about 0.25 percent by weight. Preservatives for use in polishing and cleaning compositions such as automotive polishers or automotive cleaners are well known in the art. A preferred preservative is 1-methyl-3,5,7-triaza-1-azonia tricyclo (3.3.1.1.3.7) decane, available under the trade name BUSAN® 1024, from Buckman Laboratories, Inc. (Memphis. Tenn.).

The liquid polishing compositions of the present invention can be manufactured by mixing the various components (water, petroleum-based liquid, surfactants, abrasives, and the like) together to form an emulsion/slurry by methods that are well known in the art. For example, a three-phase composition of the invention can be prepared by (a) combining about 80 percent of the desired amount of water, the hydrocarbon fluid, and the abrasives in a mixing vessel and stirring the mixture until the abrasive particles are wetted and clump-free; (b) adding the surfactants and optional fragrance to the other ingredients in the mixing vessel while continuing to stir the contents to form an emulsion with abrasives suspended therein; (c) adding the remaining water and optionally a salt-based emulsion stabilizer such as potassium chloride and a colorant to the emulsion, also with stirring to afford the finished three-phase composition as a basic slurry of abrasive in an oil and water emulsion. The pH of the slurry can be adjusted (e.g., to a pH of up to about 11, preferably about 8 to 10, more preferably about 8.5 to 9.2) by addition of a base such as ammonia or an acid such as acetic acid, if desired. The resulting slurry is continually agitated while being packaged into smaller containers for storage and use.

In use, the liquid polishing composition is applied to a wet surface (e.g., an automobile exterior surface) with an absorbent applicator, by rubbing the composition over the surface. Preferably, the absorbent applicator is a natural or synthetic sponge, a cloth, soft fabric mitt, a synthetic sponge mitt, and the like. Unlike most conventional polishing and cleaning compositions, the three-phase compositions of the invention advantageously can be rinsed from the cleaned and polished surface without leaving behind an undesirable white residue on the surface. The compositions are easier to apply than conventional clay bars for removing surface contaminants.

Another aspect of the present invention is a polishing kit, as shown in FIG. 1 (front perspective view) and FIG. 2 (perspective view showing the rear and one side). Kit 10 comprises container 12 having resealable closure 14 and including a predetermined quantity of three-phase liquid composition 16 of the invention, preferably a quantity sufficient to polish and clean an automobile several times (e.g., about three to five times). Container 12 can include label 18 identifying the composition as a polishing and cleaning composition, and optionally including other promotional, instructional or product information. Container 12 is disposed within an outer package such as a transparent, clear plastic package 20, which can be sealed with an ultrasonic weld 22 around the perimeter thereof. Internal partition 24 can be provided within transparent plastic package 20, behind container 12, to create front compartment 21 (see FIG. 2) and rear compartment 23 (see FIG. 2) within package 20, such that container 12 is disposed within front compartment 21 and is visible through clear plastic package 20. Sponge-like applicator 28 is disposed within rear compartment 23. Optionally, the kit can include a folded polishing cloth 30, as well. Instructional insert 32 can be disposed between the rear of clear plastic package 20 and applicator 28 or polishing cloth 30, when present. Instructional insert 32 preferably includes instructional indicia 34 on a surface thereof, preferably visible through clear plastic package 20.

Of course, clear plastic package 20 can be replaced by a conventional, opaque box, if desired. Partition 24 can be omitted if desired, as well. Instructional insert 32 can be replaced by a folded paper insert, a booklet, or any suitable instructional material, or can be omitted. The instructional material also can be placed on the exterior of container 12, such as on label 18.

As used herein the phrase "instructional indicia" encompasses any written information that describes the three-phase composition in any way, e.g., trade name and/or generic name, a description of the ingredients present in the composition, instructions for use of the composition, safety information, regulatory information, manufacturing information and identifiers, and the like, or any combination of two or more of the foregoing.

The following examples illustrate preferred embodiments of the present invention and are not to be considered as limiting the scope of the appended claims.

EXAMPLE 1

Three-Phase Liquid Polishing and Cleaning Composition A

Three-phase liquid polishing and cleaning Composition A, according to the present invention, was prepared by blending the following components:

(a) about 7093 parts by weight of softened water, about 1800 parts by weight of low vapor pressure hydrocarbon fluid (boiling point>232° C., vapor pressure about 0.1 mmHg at 38° C.), about 2700 parts by weight of mineral spirits (boiling point of about 160 to about 195° C., vapor pressure of about 3 mmHg at about 20° C.), about 180 parts by weight of P10 grade calcined alumina, and about 1620 parts by weight of polishing grade calcined Kaolin clay were combined in a stirring tank and thoroughly mixed to wet the alumina and clay, forming a uniform slurry;

(b) about 1836 parts by weight of sodium lauryl sulfate solution (28-30% actives in water), about 1224 parts by weight of a mixture of N-($C_{12}$-$C_{16}$)alkyl dimethylamine oxides (about 30% actives in water), about 244 parts by weight of cocamidopropyl betaine (about 30% actives in water), about 6 parts by weight of polyalkylene glycol monobutyl ether, about 18 percent by weight of BUSAN® 1024 preservative (on an "as is" basis), and about 28 parts by weight of fragrance were added to the slurry with continual stirring;

(c) an additional amount of about 1125 parts by weight of soft water containing about 122 parts by weight of potassium chloride was then added, also with continual stirring, followed by about 1 part by weight of a colorant to afford three-phase Composition A as an emulsified slurry having a pH of about 9

EXAMPLE 2

Preparation of a Polishing and Cleaning Kit

A polishing and cleaning kit of the invention was prepared as follows. About 16 fluid ounces of the three-phase liquid polishing Composition A of Example 1 was agitated to emulsify the composition and relatively uniformly suspend the abrasive particles, and was then dispensed into a resealable plastic container. The container included a label identifying the composition. The sealed container of polishing and cleaning composition was ultrasonically sealed into a clear plastic package along with an absorbent applicator. The applicator was separated from the sealed container of polishing and cleaning composition by a cardboard partition, which created a front compartment and a rear compartment in the package. The sealed container was displayed in the front compartment, while the absorbent applicator was disposed in the rear compartment. The partition included various promotional information printed thereon, and visible through the front compartment surrounding the sealed container of polishing and cleaning composition. The package also included an instructional insert, visible through the rear compartment, and mostly covering the applicator therewithin. The instructional insert included directions for using the polishing and cleaning composition and the absorbent applicator to polish and clean an automotive surface therewith.

Numerous variations and modifications of the embodiments described above can be effected without departing from the spirit and scope of the novel features of the invention. No limitations with respect to the specific embodiments illustrated herein are intended or should be inferred. It is intended that the appended claims cover all such modifications as fall within the scope of the claims.

We claim:

1. A three-phase liquid composition for polishing and cleaning a painted surface, and consisting of an organic phase, an aqueous phase, a particulate phase, and at least one surfactant consisting of an anionic surfactant, an amphoteric surfactant, a nonionic surfactant, or a combination thereof, wherein the organic phase consists of a petroleum-based liquid or a water-in-oil emulsion of the petroleum-based liquid, and optionally includes a portion of the surfactant, a portion of abrasive particles from the particulate phase, or both, the aqueous phase consists of water or an oil-in-water emulsion of the petroleum-based liquid, and optionally includes a portion of the surfactant, a portion of abrasive particles from the particulate phase, or both, and the particulate phase consists of an abrasive having a mean particle size of not more than about 2.5 microns, which is selected from the group consisting of an abrasive that is harder than the painted surface, an abrasive that is softer or as hard as the painted surface, and a combination thereof, the particulate phase optionally including a portion of the surfactant and water adsorbed onto the surface of the abrasive; wherein the composition optionally includes a preservative and an emulsion stabilizing amount of an emulsion stabilizer; and wherein the organic phase, the aqueous phase, and the particulate phase separate upon standing.

2. The three-phase liquid composition of claim 1 wherein the organic phase comprises an emulsion containing the petroleum-based liquid and water.

3. The three-phase liquid composition of claim 1 wherein the petroleum-based liquid comprises at least about 5 percent by weight of a liquid hydrocarbon having a vapor pressure of not more than about 0.1 mmHg at about 20° C.

4. The three-phase liquid composition of claim 1 wherein the abrasive that is harder than the painted surface comprises alumina.

5. The three-phase liquid composition of claim 4 wherein the alumina is a calcined alumina.

6. The three-phase liquid composition of claim 5 wherein the calcined alumina comprises not more than about 0.1 percent by weight of sodium oxide.

7. The three-phase liquid composition of claim 1 wherein the abrasive that is softer than or as hard as the painted surface comprises aluminum silicate.

8. The three-phase liquid composition of claim 1 wherein the particulate phase comprises a combination of alumina and aluminum silicate in an alumina-to-aluminum silicate weight ratio in the range of about 1:1 to about 1:15.

9. The three-phase liquid composition of claim 8 wherein the alumina-to-aluminum silicate weight ratio is about 1:9.

10. The three-phase liquid composition of claim 1 wherein the at least one surfactant consists of a combination of an anionic surfactant, an amphoteric surfactant, and a nonionic surfactant.

11. The three-phase liquid composition of claim 10 wherein the anionic surfactant comprises a linear $C_8$-$C_{20}$ alkyl sulfate.

12. The three-phase liquid composition of claim 10 wherein the amphoteric surfactant comprises a $C_8$-$C_{20}$ alkyl betaine.

13. The three-phase liquid composition of claim 10 wherein the a nonionic surfactant comprises a surfactant selected from the group consisting of a $C_8$-$C_{20}$ alkyl amine oxide, a polyalkylene glycol, a polyalkylene glycol ether, and a combination of two or more of the foregoing surfactants.

14. The three-phase liquid composition of claim 1 wherein the composition has a basic pH of up to about 11.

15. A three-phase liquid composition consisting of about 15 to about 50 percent by weight of an organic phase, about 25 to about 60 percent by weight of an aqueous phase, about 1 to about 25 percent by weight of a particulate phase, and about 3 to about 10 percent by weight of a surfactant consisting of an anionic surfactant, an amphoteric surfactant, a nonionic surfactant, or a combination thereof, on an actives basis, wherein the organic phase consists of a liquid hydrocarbon or a water-in-oil emulsion of the hydrocarbon, and optionally includes a portion of the surfactant, a portion of abrasive particles from the particulate phase, or both, the aqueous phase consists of water or an oil-in-water emulsion of the hydrocarbon, and optionally includes a portion of the surfactant, a portion of abrasive particles from the particulate phase, or both, and the particulate phase consists of a particulate abrasive having a mean particle size of not more than about 2.5 microns, which is selected from the group consisting of alumina, aluminum silicate, and a combination thereof, the particulate phase optionally including a portion of the surfactant and water adsorbed onto the surface of the abrasive; wherein the composition optionally includes a preservative and an emulsion stabilizing amount of an emulsion stabilizer; and wherein the organic phase, the aqueous phase, and the particulate phase separate upon standing.

16. The three-phase liquid composition of claim 15 wherein at least about 10 percent by weight of the liquid hydrocarbon has a vapor pressure of not more than about 0.1 mmHg at about 20° C.

17. The three-phase liquid composition of claim 15 wherein the alumina comprises calcined alumina.

18. The three-phase liquid composition of claim 17 wherein the calcined alumina comprises not more than about 0.1 percent by weight of sodium oxide.

19. The three-phase liquid composition of claim 15 wherein the aluminum silicate comprises calcined aluminum silicate.

20. The three-phase liquid composition of claim 15 wherein the composition comprises a combination of alumina and aluminum silicate in an alumina-to-aluminum silicate weight ratio in the range of about 1:1 to about 1:15.

21. The three-phase liquid composition of claim 20 wherein the alumina-to-aluminum silicate weight ratio is about 1:9.

22. The three-phase liquid composition of claim 15 wherein the surfactant consists of a combination of an anionic surfactant, an amphoteric surfactant, and a nonionic surfactant.

23. The three-phase liquid composition of claim 22 wherein the anionic surfactant comprises a linear $C_8$-$C_{20}$ alkyl sulfate.

24. The three-phase liquid composition of claim 22 wherein the zwitterionic surfactant comprises a $C_8$-$C_{20}$ alkyl betaine.

25. The three-phase liquid composition of claim 22 wherein the nonionic surfactant comprises a surfactant selected from the group consisting of a $C_8$-$C_{20}$ alkyl amine oxide, a polyalkylene glycol, a polyalkylene glycol ether, and a combination of two or more of the foregoing surfactants.

26. The three-phase liquid composition of claim 15 wherein the composition includes an emulsion stabilizing amount of an emulsion stabilizer.

27. The three-phase liquid composition of claim 26 wherein the emulsion stabilizer comprises potassium chloride.

28. The three-phase liquid composition of claim 15 Wherein the composition includes a preservative.

29. The three-phase liquid composition of claim 15 wherein the composition has a basic pH of up to about 11.

30. A polishing and cleaning kit comprising a three-phase liquid composition of claim 1 in a sealed container, packaged together with at least one absorbent applicator and instructional indicia describing the composition and how to polish and clean a painted surface therewith.

31. A polishing and cleaning kit comprising a three-phase liquid composition of claim 15 in a sealed container, packaged together with at least one absorbent applicator and instructional indicia describing the composition and how to polish and clean a painted surface therewith.

* * * * *